United States Patent [19]
Fleck

[11] Patent Number: 6,160,539
[45] Date of Patent: Dec. 12, 2000

[54] DIGITIZER SYSTEM WITH CURSOR SHAPE CHANGING AS A FUNCTION OF POINTER LOCATION ON MENU STRIP

[75] Inventor: David C. Fleck, Vancouver, Wash.

[73] Assignee: Wacom Co., Ltd., Japan

[21] Appl. No.: 09/092,901

[22] Filed: Jun. 8, 1998

[51] Int. Cl.[7] .................................................. G09G 5/00
[52] U.S. Cl. ........................... 345/173; 345/179; 345/145
[58] Field of Search .................................. 345/173, 174, 345/175, 176, 177, 178, 179, 145, 146, 157, 156; 178/18.01, 18.07, 18.1, 19.03

[56] References Cited

U.S. PATENT DOCUMENTS

| | | |
|---|---|---|
| 4,878,553 | 11/1989 | Yamanami et al. . |
| 5,004,871 | 4/1991 | Purcell . |
| 5,014,044 | 5/1991 | Murray . |
| 5,028,745 | 7/1991 | Yamanami et al. . |
| 5,055,831 | 10/1991 | Padula . |
| 5,061,828 | 10/1991 | Purcell . |
| 5,109,141 | 4/1992 | Purcell . |
| 5,111,005 | 5/1992 | Smith et al. . |
| 5,311,207 | 5/1994 | Kusumoto et al. ...................... 345/173 |
| 5,506,605 | 4/1996 | Paley . |
| 5,682,019 | 10/1997 | Katsurahira et al. . |
| 5,714,984 | 2/1998 | Fukuzaki et al. . |
| 5,717,435 | 2/1998 | Fukushima et al. . |
| 5,731,801 | 3/1998 | Fukuzaki . |
| 5,731,807 | 3/1998 | Feiekbach . |
| 5,734,377 | 3/1998 | Fukuzaki . |
| 5,736,974 | 4/1998 | Selker ..................................... 345/145 |
| 5,861,867 | 1/1999 | Ishikawa ................................. 345/145 |
| 5,900,869 | 5/1999 | Higashino .............................. 345/145 |
| 5,914,714 | 6/1999 | Brown ..................................... 345/145 |

FOREIGN PATENT DOCUMENTS

| | | |
|---|---|---|
| 63-136124 | 6/1988 | Japan . |
| 64-27729 | 2/1989 | Japan . |
| 2-73418 | 3/1990 | Japan . |
| 2-162410 | 6/1990 | Japan . |
| 2-292617 | 12/1990 | Japan . |
| 3-189716 | 8/1991 | Japan . |

*Primary Examiner*—Xiao Wu
*Attorney, Agent, or Firm*—Liniak, Berenato, Longarce & White

[57] ABSTRACT

A digitizer system includes a pointer (e.g. stylus or puck) for manipulation by a user over a work surface of a tablet. The tablet includes a menu strip area thereon. The location of the pointer on the tablet is shown by way of a cursor shape on a corresponding monitor or display which is in communication with the tablet. According to certain embodiments of this invention, the cursor shape shown on the display is changed as a function of the pointer's position within the menu strip area of the tablet. Thus, for example, a first cursor shape may be shown on the display when the pointer is over a first area of the menu strip, while a different second cursor shape may be shown on the display when the pointer is over a second area of the menu strip.

7 Claims, 4 Drawing Sheets

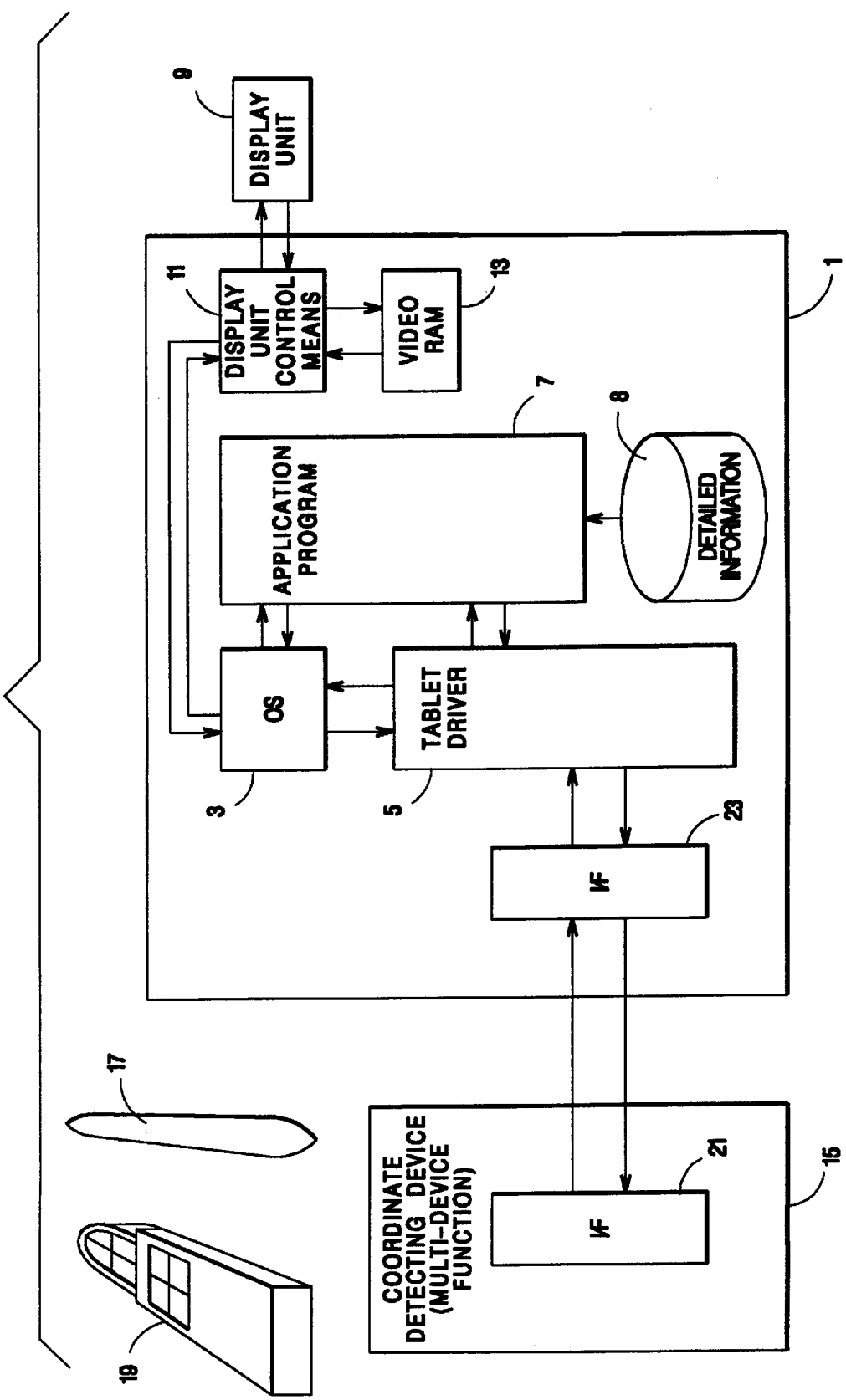

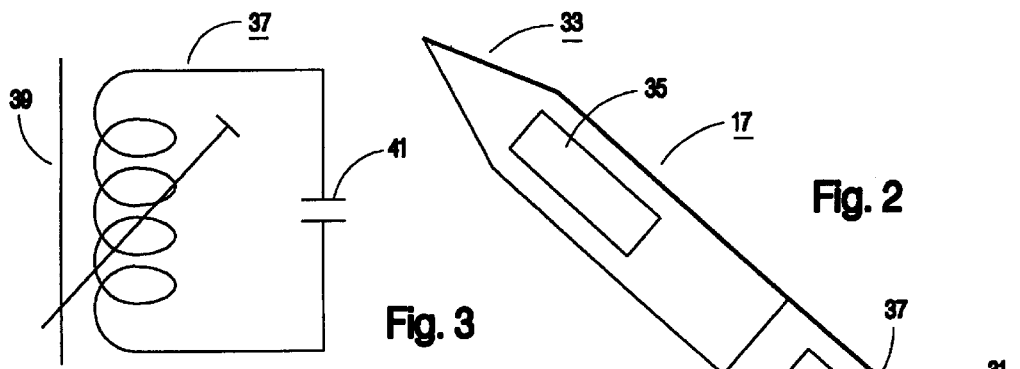
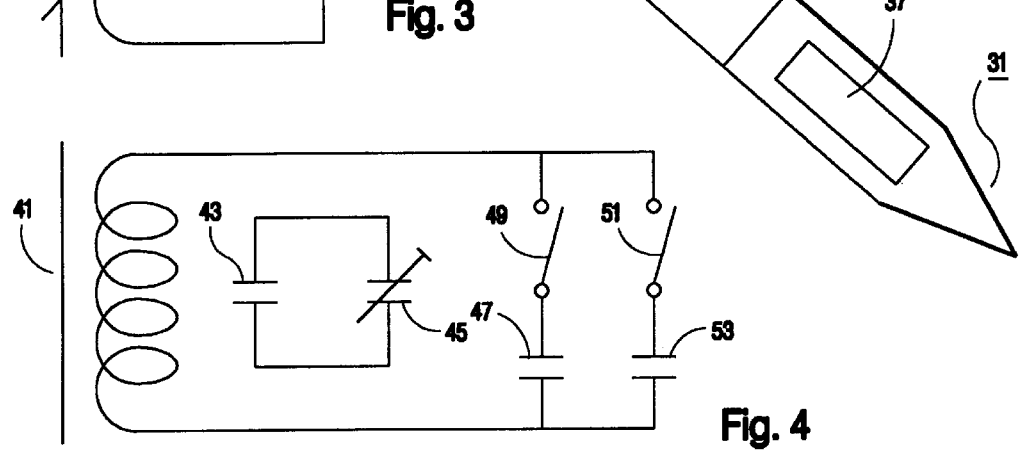
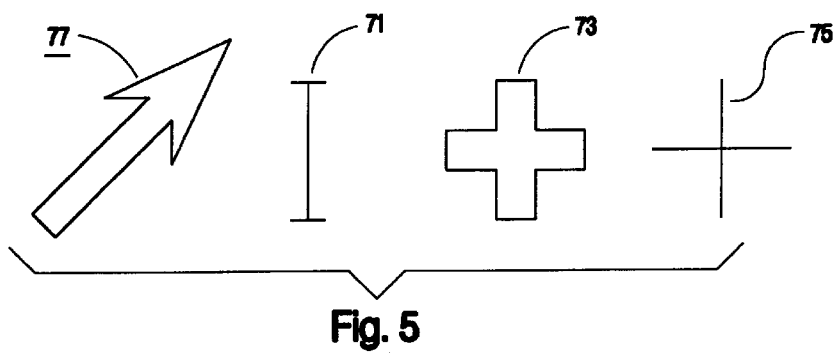
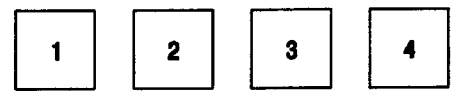
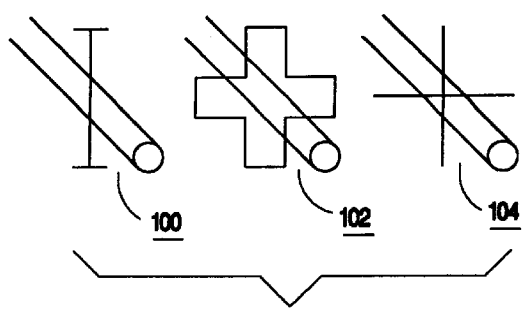

DIGITIZER SYSTEM WITH CURSOR SHAPE CHANGING AS A FUNCTION OF POINTER LOCATION ON MENU STRIP

This invention relates to a digitizer system including a pointer (e.g. stylus, puck, or the like) for movement over or along a corresponding tablet. More particularly, the system functions to change the pointer's cursor shape being portrayed on a corresponding display screen as a function of the position of the pointer within the menu strip area of the tablet.

BACKGROUND OF THE INVENTION

For many years digitizing, writing, or graphics tablets have incorporated menu strips. These are usually a series of square or rectangular blocks along the top edge of the drawing area. Clicking on one of the blocks in the menu strip with the pointing device would execute a command or change a tablet operating parameter. The problem has always been that the operator had to look away from the screen to the tablet to locate the desired menu block. This is undesirable.

It is apparent from the above that there exists a need in the art for a digitizer system wherein the user is efficiently informed or made aware of the location of the pointer (e.g. stylus, mouse, or puck) within a menu strip area of the tablet, so that the user knows in which portion of the menu strip the pointer is located without having to look downward from the screen toward the tablet.

It is a purpose of this invention to fulfill the above-described needs, as well as other needs in the art which will become more apparent to the skilled artisan once given the following disclosure.

SUMMARY OF THE INVENTION

Generally speaking, this invention fulfills the above-described needs in the art by providing a digitizer system comprising:

a digitizer tablet having a menu area and a plurality of different menu items therein;

a pointer (e.g. stylus or puck) for movement over the tablet and over the menu area; and means for providing an on-screen cue on a corresponding display screen which indicates to a user which menu item in the menu area of the pointer is proximate.

This invention further fulfills the above-described needs in the art by providing a method of changing a shape of a cursor being portrayed on a display screen as a function of a position of a pointer within a menu area of a digitizer tablet, the method comprising the steps of:

providing a digitizer tablet having a menu area with a plurality of menu items therein for selection;

providing the pointer for movement over the tablet and for selection of the menu item;

providing a display which is in communication with the tablet, wherein a cursor shape is portrayed on the display in a location determined by the position of the pointer on the tablet; and adjusting the cursor shape being portrayed on display when the pointer is moved in the menu area from one menu item to another menu item so that the user can determine which menu item the pointer is over without having to look at the tablet surface.

This invention will now be described with respect to certain embodiments thereof, along with reference to the accompanying illustrations wherein:

IN THE DRAWINGS

FIG. 1 is a functional block diagram illustrative of an embodiment of this invention wherein the tablet driver, operating system, and application program are disposed in the computer with which the digitizer tablet and corresponding pointer are in communication;

FIG. 2 is a schematic view of a double-tipped stylus which may be used according to certain embodiments of this invention, one tip for writing and the other for erasing;

FIG. 3 illustrates a variable circuit used for causing the erasing tip of the stylus of FIG. 2 to emit an erasing frequency at different phases according to certain embodiments of this invention;

FIG. 4 illustrates a tuning circuit to be used for causing the writing tip of the stylus of FIG. 2 to emit different writing frequencies and phases according to an embodiment of this invention;

FIG. 5 illustrates four non-erasing indicating typical cursor shapes to be displayed or portrayed on the display screen according to certain embodiments of this invention when the system is not in an erase mode;

FIG. 6(a) illustrates eight different cursor shapes indicative of the position of the pointer on the tablet, which may be shown on a corresponding display screen so that the user is aware of the pointer's position within the menu strip without having to look away from the display screen.

FIG. 6(b) illustrates three of the cursor shapes of FIG. 5 in their erase-indicative shapes which inform the user that an erase mode is in effect for the system;

DETAILED DESCRIPTION OF CERTAIN EMBODIMENTS OF THIS INVENTION

Figure 7A:
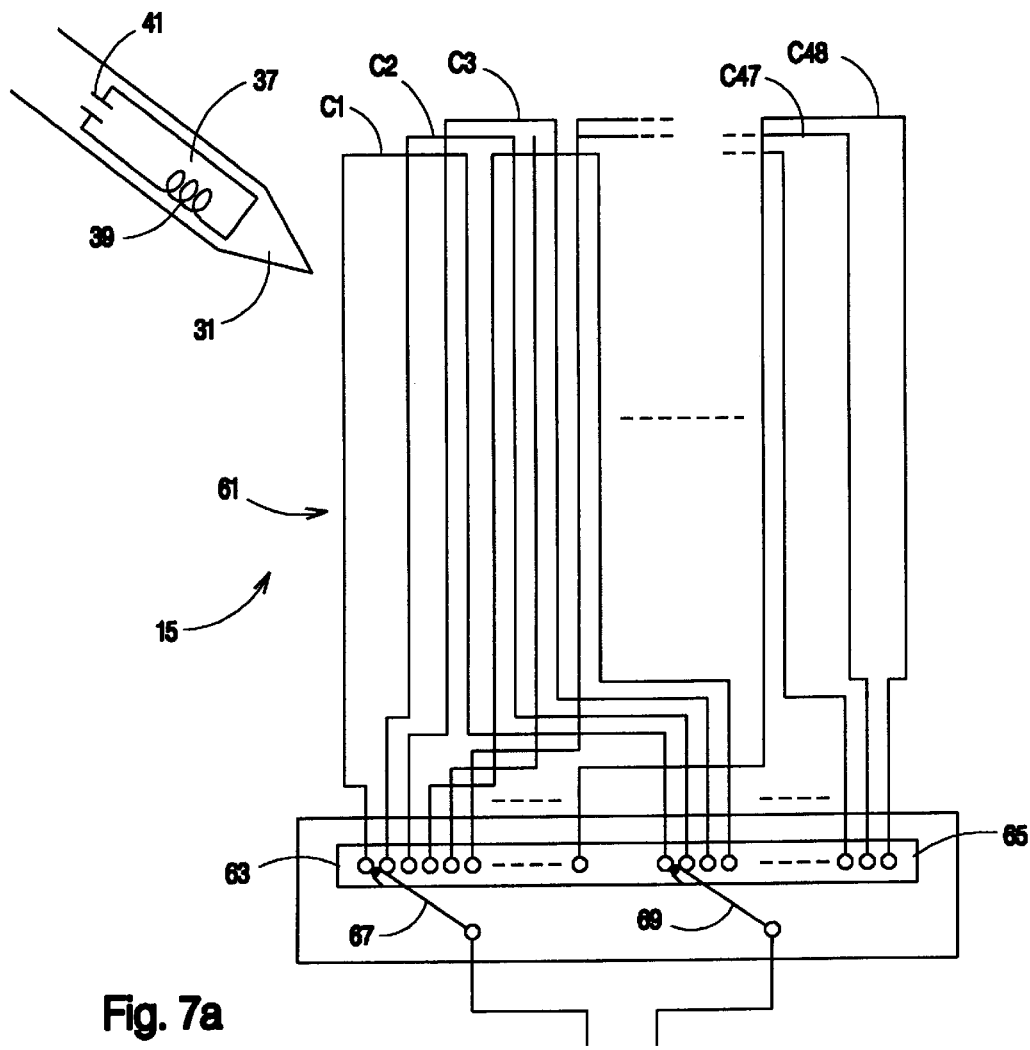
FIG. 7(a) is a schematic view of the digitizer tablet and corresponding erasing stylus according to certain embodiments of this invention.

Referring now more particularly to the following illustrations where like reference numerals indicate like parts and/or functions throughout the several views.

Digitizer tablets herein include menu areas (e.g. strips) thereon, in addition to a work area exclusive of the menu area. A typical digitizer system includes a tablet, a pointer, and a corresponding computer having a display. Movement of the pointer over or on the tablet is detected and a corresponding cursor moves accordingly on the computer's display. This enables the user to work on a computer (e.g. draw pictures, write text, etc.) by using the pointer in conjunction with the digitizer tablet. The user may manipulate a pointer over or within each of the menu area and the work area of the tablet. When in the work area for example, the user may draw pictures or write text on a corresponding display screen in a known manner. The user may also move the pointer (e.g. stylus or puck) within the menu area so as to vary parameters of the system in a known manner. The menu area of the tablet has a plurality of different sub-areas or blocks defined therein. An important feature of this invention is to enable the user of a pointer to be able to tell in which sub-area or block of the menu area the pointer is located without the user having to look away from the display screen.

Figure 8:
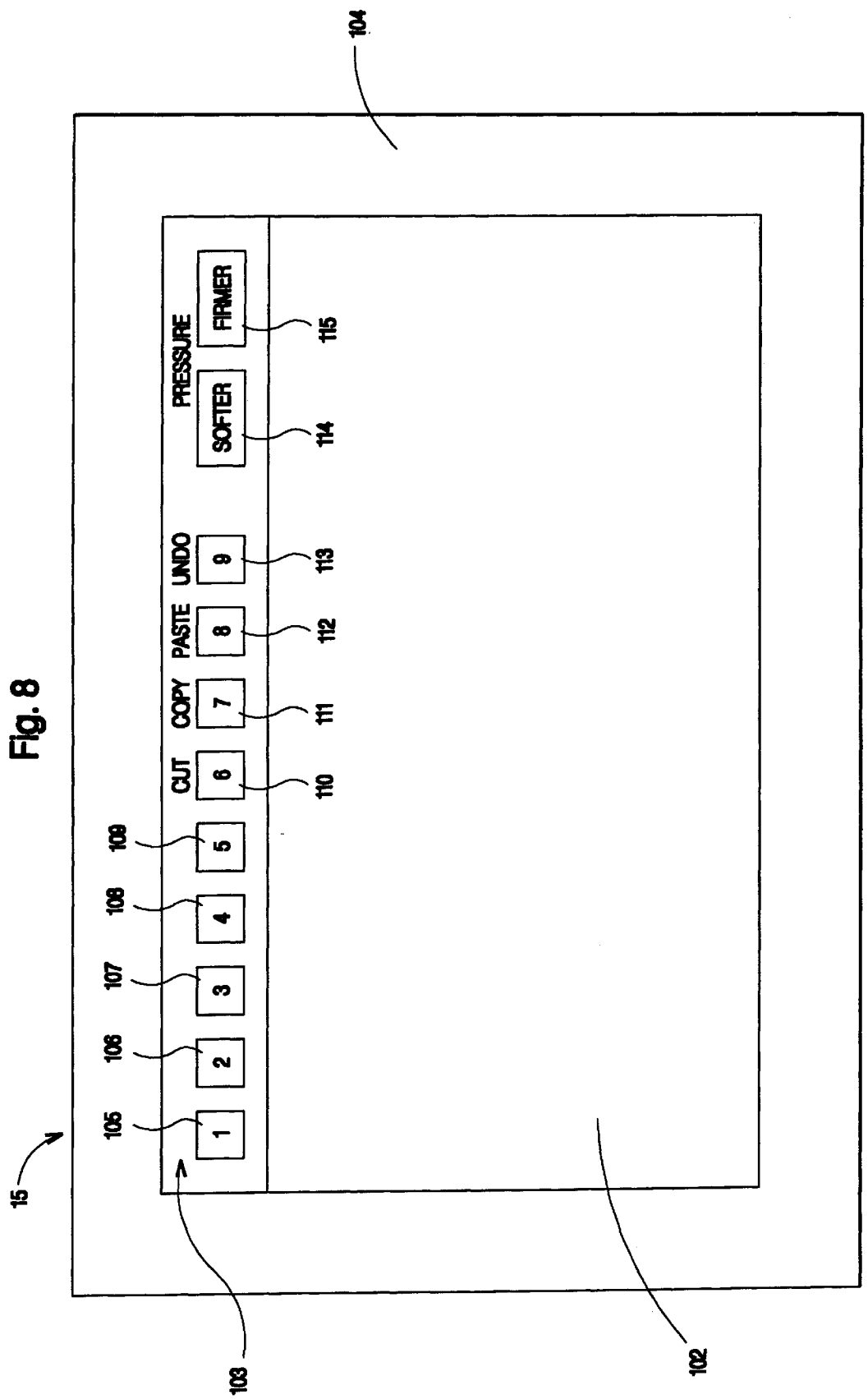
FIG. 8 is a top view of a digitizer tablet according to an embodiment of this invention wherein the tablet includes a menu strip area thereon in which the pointer may be manipulated.

FIG. 8 illustrates a digitizer tablet 15 according to an exemplary embodiment of this invention, with tablet 15 including work area 102, menu area or strip 103, and border area 104 which encompasses the work and menu areas. The menu strip or area 103 includes a plurality of different sub-areas or blocks 105–115. The user may move the pointer over both work area 102, as well as over any subarea 105–115 within menu area 103 of the tablet. Selection of different menu subareas 105–115 allows the user to vary different control or graphical parameters of the system. For example, the user may use the menu subareas to vary line width of an image being drawn, color of an image being drawn, pressure thresholds or parameters relating to the pointer, and the like, in a known manner. Tablet 15 is typically connected to a corresponding computer 1 which has a display screen 9 (e.g. LCD, CRT, plasma panel, or the like). Movement of the pointer 17, 19 on tablet 15 causes the system to cause a corresponding cursor having a shape to move across display 9 in a corresponding manner. The user may manipulate the position of the cursor on the display by moving the pointer 17, 19 over tablet 15. Tablet 15 includes a generally flat work surface on which pointers may be moved.

In accordance with certain embodiments of this invention, a first cursor shape is shown on display screen 9 when the pointer 17, 19 is over a first area (e.g. area 105) of menu area 103, and a second different cursor shape is shown on display 9 when the pointer is over a second area (e.g. area 109) of menu area 103. In such a manner, the user can tell exactly where in the menu area the pointer is located simply by viewing the cursor shape on the display, and without having to look down at tablet 15. The need for the user to look down at the tablet is thus eliminated by giving the user/operator an on-screen cue (e.g. changing cursor shape) depending upon the menu item which the user's pointer is over. It is important to give the cue when the pointer is over the menu item, before the item is selected, for the cue to be especially useful in the selection process. Thus, the cursor shape quickly changes on display 9 as a function of the pointer's location in the menu area.

While changing cursor shape is a preferred on-screen cue of this invention, it is noted that other on-screen cues could instead be used. For example, information may instead be presented on screen 9 as text or graphics in a floating window as a function of the menu item which the pointer is over.

FIG. 1 is a functional block diagram illustrative of an exemplary digitizer system of this invention, this figure schematically illustrating the functions implemented by the CPU of computer 1. Either software (e.g. see microfiche appendix) or hardware may be used to carry out the various functions described and shown herein.

Computer 1 (such as a Macintosh with 680XX processor) includes typical computer components including a CPU (not shown), buses (not shown) connected to the CPU, and a memory. Stored in the memory are an operating system (OS) 3, tablet driver 5, application program 7, and optionally detailed information 8 such as tilt data, switch data, high resolution data, etc. The CPU implements application program 7, along with operating system 3 and tablet driver 5 by executing the required programs in accordance with particular situations. The processing of application program 7 along with operating system 3 and tablet driver 5 is shown on display unit 9 primarily by way of display unit controller 11 and video RAM 13, with OS 3 being in communication with display controller 11 and RAM 13 for loading the driver software into RAM 13 instructing controller. RAM 13 is accessed by controller 11 to refresh display screen 9 image.

Coordinate detecting device or digitizer tablet 15 detects the position(s) of electronic pen 17 and/or electronic cursor or puck 19 (i.e. alternative pointers) along with their corresponding emitted frequency and/or switch states. Exemplary methods and systems utilized for detecting the position and switch states of multiple position pointing devices (17 and 19) by tablet 15 and computer 1 are disclosed in commonly owned U.S. Ser. Nos. 08/388,265 and 08/352,133, the disclosures of which are hereby incorporated herein by reference.

Coordinate detecting digitizer tablet 15 and computer 1 are connected by way of interface 21 of tablet 15 and interface 23 of computer 1. Application program 7 may (or may not) be designed for use with tablet 15 and stylus 17 according to different embodiments of this invention. In the configuration shown in FIG. 1, tablet driver 5 is intended for use with a single pointing device (e.g. mouse or pen) and is designed to accept coordinate and switch information from only one device. However, when multiple pointing devices such as pen 17 and cursor or mouse 19 are utilized, the system(s) of above-mentioned 08/352,133 and 08/388,265 may be implemented according to certain embodiments.

Operating system 3 is software such as Macintosh, MS-DOS, or MS-WINDOWS (both trademarks of Microsoft, Inc.). Any conventional Macintosh or other PC type operating system (OS) will also suffice. Application program 7 refers to conventional database software, graphic software, spreadsheet software, CAD software, and word processor software. Microsoft WORD™, Excel™, PowerPoint™, Fractal Design Dabbler™, Macromedia Freehand™, Adobe Photoshop™, Adobe Illustrator™, Fractal Design PAINTER™, Wordperfect™, and LOTUS 1-2-3™ are exemplary application programs which may be used in different embodiments of this invention. Application program 7 may or may not be designed for use with digitizer tablet 15 and stylii according to different embodiments of this invention. For example, Fractal Design PAINTER is designed to work with some pen pressure and position data while Wordperfect is not. Both may be used as program 7, because driver 5 is designed to provide the user erasing capability for a variety of application programs.

Tablet driver 5 is a so-called driver device provided for the user by the manufacture of the coordinate detecting device 15 and digitizer system. Tablet driver 5 is often a program installed in computer 1 (via floppy disc for example) for the purpose of transferring coordinate information, switch information, frequency information, and other detailed information from stylus coordinate detecting digitizer tablet 15 to operating system 3 or application interface layer (API) or application program 7. This transfer includes not only the active transfer of data but also passive transfer which enables application program 7 or the like to obtain the data. Since these three programs are software, it is possible to incorporate a part of each of their functions in other programs. For example, all functions of tablet driver 5 could be included in application program 7.

When an operator or user performs a coordinate input by way of erasing/writing stylus 17 or cursor pointer 19, the operator visually checks the contents shown on display screen 9. The interactive input is primarily governed by application program 7. Taking the pointing input in a graphic processor (CAD) as an example, if a pointed position is in a drawing area 102 of tablet 15, then the application program 7 displays the pointer indicating the pointed-to position (e.g. via a cursor shape such as an arrow or a cross) on screen 9. If the pointed-to position is in the menu display area 103 of Microsoft WORD for example, then application program 7 portrays a cursor shape which is determined by the location of the pointer within the menu area. For example, the cursor shapes of FIG. 6(*a*) may be used for different pointer location within menu area 103.

While observing screen 9, the operator or user moves a pointing device (17 or 19) to select the desired point or menu item and when a desired position is reached, the operator may turn on a stylus switch (e.g. stylus side switch or pressure switch) for the purpose of either writing, selecting, dragging, erasing, etc. The user need not look down at the tablet because the cursor shape on display 9 indicates to the user what menu item the pointer is positioned over for selection. Driver 5 and application program 7 receive switch data, frequency data, and coordinate values and process them through operating system 3 so that processed information responsive thereto is output on display unit 9.

Because OS 3 does not recognize stylus and tablet data (e.g. tilt detection, pressure switch data, etc.) in certain embodiments, such detailed data is stored at 8 for later retrieval by application program 7. For example, high resolution stylus position data, stylus pressure and tilt data, switch data, and stylus eraser data are stored in detailed information area 8 for later retrieval. Cursor shape information may also be stored here, although any memory will suffice.

FIG. 2 illustrates cordless digitizing pen or stylus 17 which has an erasing end 31 and a writing end 33. Parallel resonance tuning circuit 35 (see FIG. 4) is provided for allowing writing tip 33 to emit a plurality of different writing frequencies (e.g. frequencies A, B, and C) and phases. Separate and distinct from writing circuit 35 is eraser tuning circuit 37 of FIG. 3 which is provided in erasing tip 31 of stylus 17.

According to certain embodiments, eraser tip 31 is used to select and delete text, cells, or other objects displayed on screen 9 from OS 3 and/or application program 7 with one stroke. In one motion, the user presses the pen 17 down to the tablet 15 to select text for erasure, moves the pen 17 (i.e. tip 31) across the text to be erased, and at the end of the selection then lifts the tip 31 off the tablet 15 to cause the selection to be erased.

Eraser circuit 37, shown in FIG. 3, includes variable coil 39 and capacitor 41. Both ends of coil 39 are connected to capacitor 41 which is charged by the tablet. Variation (in order to change the phase of the frequency) of coil 39 and thus the phase output by circuit 37 is caused by the amount of pressure applied to the surface of tablet 15 by erasing tip 31 according to certain embodiments of this invention. Should a predetermined pressure threshold be exceeded, then circuit 37 is caused to emit the frequency at a predetermined phase (erasing signal) indicative of selection of material for erasure. In other words, circuit 37 emits an eraser indicating signal when the pressure threshold is not broken by the user (e.g. when tip 31 is not in contact with the tablet or is lightly in contact therewith below the pressure threshold) and an erasing signal (particular phase of the frequency) when the user presses tip 31 against the tablet and causes the threshold to be broken. Thus, when the amount of pressure on tip 31 is above a predetermined threshold, material passed over by tip 31 is selected for erasure and is subsequently removed from screen 9 when the amount of pressure falls below the threshold because tip 31 is lifted from tablet 15. Alternatively, circuit 37 may instead utilize a fixed coil and a variable capacitor. The threshold value which causes circuit 37 to begin emitting the erasing signal (frequency with predetermined phase) may be adjusted by the user according to user preference. While the eraser indicating signal emitted from circuit 37 is at a predetermined frequency according to certain embodiments, any other conventional signal which identifies eraser tip 31 will suffice.

Accordingly, erase circuit 37 continually emits an eraser indicating signal which is at a predetermined frequency, and an erasing signal which is at a specific phase if the frequency determined by variation in coil 39 as the tip pressure threshold, for example, is broken.

Writing tuning circuit 35 (see FIG. 4) is a parallel tuning circuit composed of coil 41, capacitor 43 and variable capacitor 45 (e.g. tip pressure sensitive switch). Tuning circuit 35 (and circuit 37) has a resonant frequency capable of tuning with the frequency generated from the sensing coil(s) of the tablet when electric power is applied to the sensing coil(s). Both ends of coil 41 are connected to capacitor 47 through first optional switch 49 (e.g. a first side switch), so that the frequency of the electromagnetic wave of tuning circuit 35 is changed when first switch 49 is turned on. In addition to first switch 49, optional second switch 51 (e.g. a second side switch) and corresponding capacitor 53 may be connected in parallel to the first switch so that the frequency of the electromagnetic wave for writing tuning circuit 35 is changed when second switch 51 is turned on or actuated. Second switch 51 is arranged along the exterior of stylus 17, as is switch 49 at, for example, a position to which a finger of the operator can easily touch and actuate when the operator is handling stylus 17 (see FIG. 7(*b*)).

For example, write circuit 35 may emit frequency "A" (e.g. 531 kHz) when switches 49 and 51 are open, frequency "B" (e.g. 562 kHz) when switch 49 is closed and switch 51 is open, and frequency "C" (e.g. 590 kHz) when switch 49 is open and switch 51 is closed. According to certain embodiments of this invention, erase circuit 37 also emits frequency "C" (as its eraser indicating signal) which is the same frequency emitted by circuit 35 when switch 49 is open and switch 51 is closed. Difficulties arising from both the write and erase circuits being capable of emitting the same frequency for different reasons are overcome as set forth in FIG. 13 and the corresponding description discussed below.

FIG. 7(*a*) illustrates X-direction detecting unit 61 of digitizer tablet 15 along with erasing tip 31 of pen 17. The coils of the detection units of tablet 15 are located within the tablet's housing, while the menu strip area is marked on the outside of the tablet's housing. The X axial direction detecting unit 61 includes a plurality of sensing coils $C_1$, $C_2$, $C_3$, ... $C_{47}$, and $C_{48}$ which are composed of loop conductors partially overlapped and arranged in parallel with each other in the X axial direction. The longitudinal direction of these coils is oriented in the same direction; i.e. Y direction. Although this embodiment shows the X direction detecting units 61 including forty-eight sensing coils, the present invention is not limited to this number and also includes Y direction coils as is known in the art.

One end of the sensing coils is connected to first terminal unit 63 and the other end is connected to second terminal unit 65. One terminal of first unit 63 is selectively connected to first selecting terminal 67 with the other terminals being free. Terminal 67 is connected to only one terminal of unit 63 at a time and successively scans the terminals. A second selecting terminal 69 is linked with first selecting terminal 67 so as to connect to the other end of the sensing coil(s). First and second terminal units 63 and 65, and first and second selecting terminals 67 and 69, constitute a selective circuit. In such a manner, sensed coordinates, frequencies, and switch data are output from tablet 15 via interface 21 to tablet driver 5 disposed in computer 1.

Figure 7B:
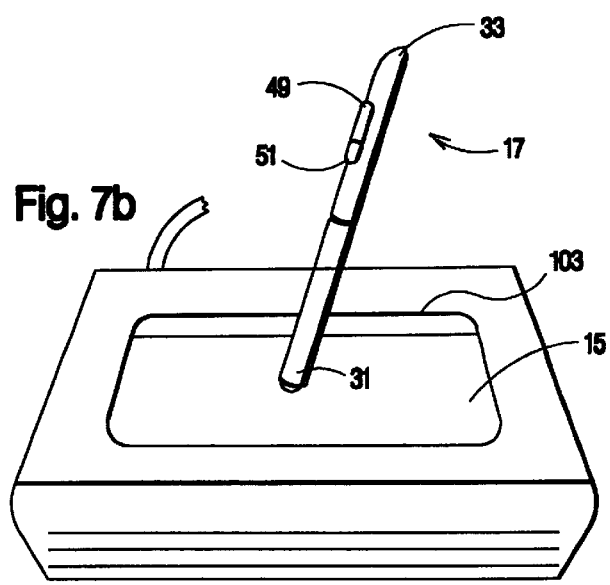
FIG. 7(b) is a perspective view of the erasing/writing stylus or pen (of FIGS. 2 and 7(a)) being used in conjunction with the tablet.

FIG. 7(b) illustrates the use of stylus 17 (including erase tip 31 and write tip 33) in conjunction with tablet 15. In this figure, erase tip 31 is within sensing proximity of tablet 15 while write tip 33 is outside proximity. Switches 49 and 51 of stylus 17 are shown here as side switches to be selectively actuated by a finger of the user.

FIG. 5 illustrates different cursor shapes 71, 73, 75, and 77 which may be shown on display 9 when the system is not in an erase mode. FIG. 6(b) illustrates cursor shapes 81, 82, and 83 which are erase-indicative cursor shapes for being shown on screen 9.

Turning back to the adjustment of cursor shape as a function of pointer location in the menu area 103 embodiment of this invention, in certain embodiments the cursor shape (e.g. any one of the FIG. 6(a) cursor shapes) conveys information to the user which indicates the function or number of the menu item 105–115 which the pointer is positioned over. For example, the upper left hand cursor shape shown in FIG. (a) could be used as the cursor shape on display 9 when the pointer is over menu item 105, so that the number one inside of the block on the cursor shape simulates or is indicative of the menu block that the pointer is over. Thus, the user knows which menu item may be selected proximate the pointer without having to look down at tablet 15.

As an example the following code could be used to change the screen cursor:

```
If (X position > bottom of menu item) AND (Y position <
top of menu item)
    AND (normal cursor = TRUE) // in the menu
    Normal cursor = FALSE; // remember we changed it
    Old cursor = current cursor;   // remember the old
                                     shape to restore
    Set Cursor (menu shape); // display a square system
                                cursor
Else
    If (Normal cursor = FALSE)      // were over menu but
                                      no longer
    Normal cursur - TRUE; // back to normal shape
    Set Cursor (Old Cursor); // set the shape
```

The aforesaid code may be used because each menu item 105–115 on tablet 15 is located by the system by way of x and y coordinates. Thus, the area within menu item 105 may be defined between a small number of x coordinate values and a small number of y coordinate values. By determining the coordinate values of the pointer on the tablet 15, and plugging the values into a program such as the one set forth above, the system can determine in which menu box or area the pointer is located and thus show a predetermined corresponding cursor shape on display 9.

Once given the above disclosure, therefore, various other modifications, features, or improvements will become apparent to the skilled artisan. Such other features, modifications, and improvements are thus considered a part of this invention, the scope of which is to be determined by the following claims.

What is claimed is:

1. A digitizer system comprising:

a digitizer tablet including a generally flat surface;

a pointer for movement by a user over the generally flat surface of said digitizer tablet, so that a cursor shape is shown on a corresponding display in a location which is a function of a position of said pointer on said tablet;

said digitizer tablet including a menu area and a work area, the menu area including a plurality of different menu item sub-areas therein capable of being selected by the user; and a controller in operative association with said pointer and the display so that the cursor shape shown on the display varies as a function of which menu item sub-area the pointer is positioned over on the tablet without requiring that the sub-area be selected by the pointer, the cursor shape being indicative of the sub-area underlying the pointer.

2. The digitizer system of claim 1, wherein said tablet includes a plurality of overlapping loop coils for generating electromagnetic waves to be sent to said pointer.

3. The digitizer system of claim 1, wherein said pointer is a stylus which includes a tuning circuit having each of a capacitor and an inductive coil.

4. The digitizer system of claim 1, wherein said pointer is a puck which includes a tuning circuit.

5. The digitizer system of claim 1, wherein said menu item sub-areas are boxes identified by number, and wherein the cursor shape displayed on the display conveys information which indicates to the user the menu item sub-area which the pointer is over.

6. The digitizer system of claim 1, further including means for determining the coordinate values of a location of the pointer relative to the tablet, and changing the cursor shape being shown on the screen as a function of the coordinate values determined.

7. A method of changing a shape of a cursor being portrayed on a display as a function of a position of a pointer within a menu area of a digitizer tablet, the method comprising the steps of:

providing a digitizer tablet having a menu area with a plurality of menu items therein for selection;

providing the pointer for movement over the tablet and for selection of the menu items;

providing a display which is in communication with the tablet, wherein a cursor shape is portrayed on the display in a location determined by the position of the pointer on the tablet; and providing a controller in operative association with the pointer and the display for adjusting the cursor shape being portrayed on the display when the pointer is moved in the menu area from one menu item to another menu item so that the user can determine which menu item the pointer is over without having to look at the tablet surface and without requiring that the menu item be selected, the cursor shape being indicative of the menu area underlying the pointer.

* * * * *